UNITED STATES PATENT OFFICE.

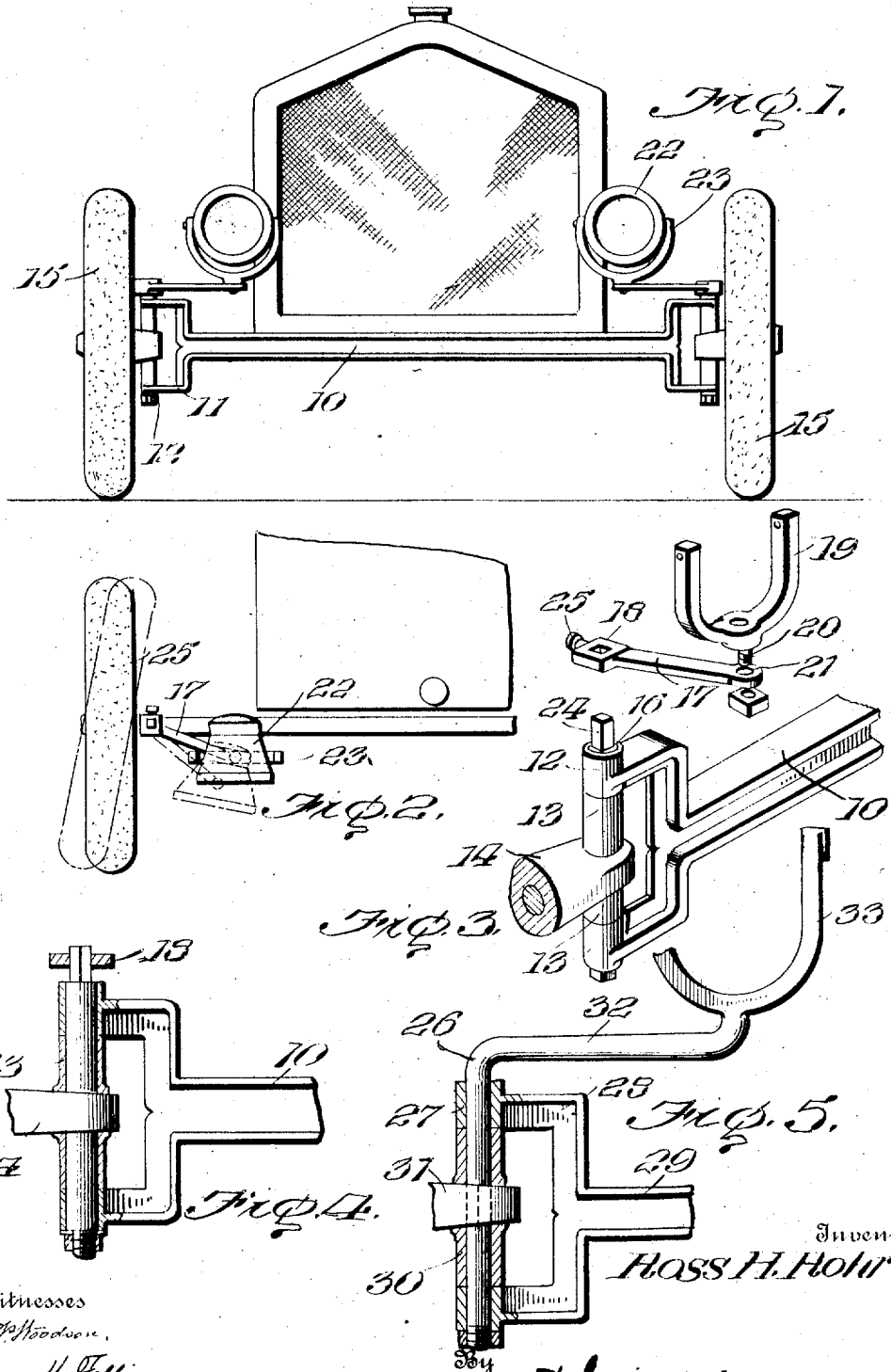

ROSS H. ROHRER, OF QUARRYVILLE, PENNSYLVANIA.

AUTOMOBILE LAMP-BRACKET.

987,322.   Specification of Letters Patent.   Patented Mar. 21, 1911.

Application filed August 5, 1909. Serial No. 511,373.

*To all whom it may concern:*

Be it known that I, ROSS H. ROHRER, citizen of the United States, residing at Quarryville, in the county of Lancaster and State of Pennsylvania, have invented certain new and useful Improvements in Automobile Lamp-Brackets, of which the following is a specification.

This invention relates to lamps and the fittings therefor and refers particularly to an improved lamp holder for use in connection with vehicles.

An object of this invention is to form a holder which is actuated by the steering wheels of a vehicle whereby the lamps which are carried by the brackets are thrown into different angles in accordance with the direction in which the vehicle is being turned.

The invention has for another object the provision of a bracket arm which is carried upon the spindle which supports the forward wheel of the motor vehicle upon the forked arms at the end of the front axle whereby the bracket arm may be employed for the purpose of inserting and withdrawing the spindle when it is desired to remove the supporting sleeve from the fork arms of the axle.

The invention has for a further object the provision of a bracket which is carried directly upon the spindle which supports the steering wheel so as to act positively therewith in order to dispose the lamp at such angles as the vehicle is turned to throw the rays of the lamp about the curve over which the vehicle is traveling.

The invention has for a still further aim the provision of a lamp bracket of this character which may be economically produced and readily attached to the wheels of vehicles and which will support lamps of any approved construction.

For a full understanding of the invention and the merits thereof, and also to acquire a knowledge of the details of construction, and the means for effecting their result, reference is to be had to the following description and accompanying drawings, in which;

Figure 1 is a front elevation of a motor vehicle having the improved lamp brackets applied to the same; Fig. 2 is a detailed top plan view of one of the wheels supporting the improved lamp bracket thereon; Fig. 3 is a fragmentary perspective view of the improved lamp bracket and means for supporting the same, the parts being shown as separated; Fig. 4 is a front elevation of one end of the axle of the vehicle disclosing the application of the improved lamp bracket to the same, the view partly shown in section; and Fig. 5 is a front elevation of one end of the axle disclosing a modified form of the bracket as applied to the same, the view being partly disclosed in section.

Corresponding and like parts are referred to in the following description and indicated in all the views of the accompanying drawings by the same reference characters.

Referring to the drawings, in which is disclosed an embodiment of the invention, the numeral 10 designates the front axle of a motor vehicle which is provided with fork arms 11 at its opposite ends which are disposed in vertical alinement and which are provided at their outer ends with journal bearings 12. Disposed between the journal bearings 12 are spindle sleeves 13 which carry intermediately stub axles 14 projected outwardly from the sleeves 13 and upon which the wheels 15 are mounted. The sleeves 13 are supported within the bearings 12 by the provision of a spindle 16 which is engaged through the bearings 12 and sleeve 13 and is engaged rigidly with the sleeve 13 by reason of the rectangular formation of the spindle 16, and the formation of the rectangular bore through the sleeve 13. By this operation the spindle 16 is rotated with the stub axle 14 and caused to assume the same angle therewith.

The improved bracket which is automatically operated by the throwing of the wheels 15 into various angles comprises an arm 17 which is of flattened formation and which is provided at its rear extremity with a rectangular collar 18 fitting in an angular opening centrally formed therethrough, the angles of which are disposed in diagonal alinement with the axis through the arm 17 in order to extend the arm 17 inwardly and forwardly of the spindle 16. Upon the outer end of the arm 17 a U-shaped support 19 is positioned which is provided with a depending shank 20 for engagement in an opening 21 disposed through the outer end of the arm 17 whereby the support 19 is retained rigidly with respect to the arm 17. The shank 20 is secured to the arm 17 by the provision of a suitable clamping nut or the like which is engaged over the lower rounded and threaded extremity of the shank 20 which protrudes below the arm 17 when in position. The support 19 carries in any suitable manner a lamp 22, which is secured therein by set screws 23 or the like to deflect the lamp at a forward angle and to retain the same in such position, according to the requirements necessary with respect to the height of the arms above the road-way.

The spindle 16 is provided with a rectangularly formed and shouldered portion 24 which engages through the collar 18 and rigidly retains the arm 17 thereon through the medium of the set screw 25 carried by the collar 18.

The modification disclosed in Fig. 5 comprises a shank 26 which is extended through the bearings 27 formed upon the outer extremities of the forked arms 28 of the front axle 29 and is rigidly engaged intermediately with the spindle sleeve 30 which is positioned between the bearings 27 and which is carried upon the stub axle 31 to which the wheel is secured. The spindle 26 extends upwardly beyond the upper bearing 27 and is curved inwardly and forwardly to form an arm 32 which is forked at its outer extremity as at 33, the arms of the fork 33 being extended upwardly to support the vehicle lamp. In the latter construction disclosed in Fig. 5 when the stub axle 31 is moved into various angles the sleeve 30 is carried therewith and the spindle 26 is likewise rotated into such angle. This movement causes the vibration of the arm 32 to carry the support 33 and to dispose the lamp which is carried by the support 33 into the same angle as that of the wheel thereby projecting the rays of the lamp about the curve in which the vehicle is traveling.

In the preferred form above described as the wheels 15 are turned into an angle to direct the vehicle around a curve, the sleeves 13 are likewise rotated and carry therewith the spindles 16. By reason of the rigid relation of the collars 18 upon the spindles 16 the arms 17 are thrown into a corresponding angle with the wheels 15 to thereby carry the lamps 22 into such angle and to project the rays therefrom about the curve in which the vehicle is traveling.

From this construction it is readily observed that the lamps 22 are positively and automatically thrown into the required angle about which the vehicle is traveling and that they are not dependent upon any mechanism which is mounted upon the frame of the vehicle and which is secured to the steering post.

Having thus described the invention, what is claimed as new is;

1. The combination with a steering wheel of a motor vehicle having a stub-axle, and a fixed axle, the end of which is forked and provided with journal bearings between which said stub-axle fits, of a rotatably movable spindle passing through said journal bearings and stub-axle, an arm extending outward from said spindle, a U-shaped yoke carried upon the end of the arm, a lamp rotatably supported in said yoke, and means for adjusting the lamp in any desired rotated position.

2. The combination with a vehicle wheel of a traction vehicle, said wheel having a stub-axle, and a rigid axle having a forked extremity provided with journal bearings between which said stub-axle is supported, of a spindle extending through the journal bearings and said stub-axle, a bracket arm extending outward from the spindle, means for rotatably adjusting the bracket arm relative to the stub-axle and the rigid axle, a lamp support rotatably mounted upon the extremity of said arm for movement in a horizontal plane, means for holding the lamp support in any adjusted position, and a lamp rotatably mounted upon the support for movement in a vertical plane, and means for holding the lamp in any adjusted position.

3. The combination with the road steering wheel of a motor vehicle having a stub-axle, of a spindle engaging with the stub-axle to rotate therewith, said spindle having a many-sided head, and a lamp bracket having a rigid arm formed with a many-sided socket adapted to fit over said head, the other extremity of the arm being perforated, a U-shaped yoke having a stud extending into said perforation and being thereby rotatably adjustable, means for holding the yoke in any desired rotatably adjusted position, a lamp mounted between the arms of the yoke, and set-screws passing through the arms of the yoke and engaging the lamp, permitting said lamp to be adjusted in a vertical plane.

4. The combination with a motor vehicle having a fixed front axle forked at its extremity, the forked extremity being formed with journal bearings, a traction wheel having a stub-axle, the extremity of the axle being provided with opposed vertically extending sleeves, of a spindle passing through the journal bearings of the fixed axle, extending through said sleeves and thereby rotatably connecting the stub-axle to the fixed axle, the extremity of said spindle being reduced and formed with a many-sided head projecting beyond one of said journal bearings, of a lamp supporting arm having a many-sided opening at one end adapted to fit upon the many-sided head of the spindle, the other end of said arm being formed with a perforation, a set-screw clamping the arm upon the head of the spindle, a lamp supporting yoke rotatably mounted upon the other end of the arm and having a screw-threaded stud passing down through the opening in the arm, a nut engaging said stud to hold the yoke in any rotatably adjustable position upon the arm, a lamp mounted between the arms of the yoke, and set-screws passing through the extremities of said arms and engaging the lamp.

5. As an article of manufacture, a lamp bracket adapted to be attached to the spindle of a motor vehicle wheel, said bracket comprising an arm formed at one end with an opening through which the end of the spindle is adapted to pass, the other end of the arm being formed with an opening, a set-screw passing into the opening into the first named end of the arm, a bifurcated yoke having a stud extending into the opening of the other end of the arm, a nut engaging with said stud to hold the yoke in any rotatably adjusted position relative to the arm, and a lamp supported between the arms of the yoke and rotatable in a vertical plane.

6. The combination with a steering wheel of a motor vehicle having a stub-axle, and a fixed axle, the end of which is forked and provided with journal bearings between which said stub-axle fits, of a rotatably movable spindle passing through said journal bearings and stub-axle and rotatable with the stub-axle, an arm extending outward from said spindle, and means whereby said arm may be rotatably adjusted relative to the stub-axle.

7. The combination with the road steering wheel of a motor vehicle, said wheel having a stub-axle, of a spindle engaging with the stub-axle to rotate therewith, a rigid axle provided with a journal bearing in which said spindle rotates, a bracket arm extending outward from the spindle, a lamp carried upon the extremity of said arm, and means for rotatably adjusting the bracket arm relative to the stub-axle.

In testimony whereof I affix my signature in presence of two witnesses.

ROSS H. ROHRER. [L. S.]

Witnesses:
J. F. ANDREWS,
FRANK W. HELM.

---

Copies of this patent may be obtained for five cents each, by addressing the "Commissioner of Patents, Washington, D. C."